(12) United States Patent
Inoue et al.

(10) Patent No.: US 7,651,176 B2
(45) Date of Patent: Jan. 26, 2010

(54) BRAKE SYSTEM

(75) Inventors: Arata Inoue, Saitama (JP); Takaaki Ohnishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 11/981,707

(22) Filed: Oct. 31, 2007

(65) Prior Publication Data

US 2008/0290726 A1 Nov. 27, 2008

(30) Foreign Application Priority Data

Dec. 12, 2006 (JP) .............................. 2006-334798

(51) Int. Cl.
*B60T 8/44* (2006.01)
(52) U.S. Cl. .................................. 303/114.1
(58) Field of Classification Search .................. 60/548; 188/358–360; 303/114.1, 122, 155
See application file for complete search history.

(56) References Cited

U.S. PATENT DOCUMENTS

| 3,922,858 | A | | 12/1975 | Sadler |
| 5,332,303 | A | | 7/1994 | Wupper |
| 6,033,036 | A | | 3/2000 | Rueffer et al. |
| 6,164,733 | A | * | 12/2000 | Uzzell ........................ 303/122 |
| 6,315,370 | B1 | | 11/2001 | Feigel et al. |
| 7,077,482 | B2 | * | 7/2006 | Matsuno et al. ........... 303/114.1 |
| 2002/0017820 | A1 | * | 2/2002 | Nishii et al. .............. 303/114.1 |
| 2002/0084693 | A1 | | 7/2002 | Isono et al. |
| 2003/0020327 | A1 | * | 1/2003 | Isono et al. .............. 303/113.4 |
| 2003/0098611 | A1 | * | 5/2003 | Drott et al. ............... 303/114.1 |

FOREIGN PATENT DOCUMENTS

| DE | 3424912 A1 | 1/1986 |
| EP | 1 219 516 A | 7/2002 |
| GB | 1 354 987 A | 5/1974 |
| JP | 04-362454 | 12/1992 |
| JP | 11-513630 | 11/1999 |
| JP | 3205570 | 6/2001 |
| JP | 2002-200973 | 7/2002 |
| JP | 2003-034244 | 2/2003 |

* cited by examiner

*Primary Examiner*—Christopher P Schwartz
(74) *Attorney, Agent, or Firm*—Carrier, Blackman & Associates, P.C.; William D. Blackman; Joseph P. Carrier

(57) ABSTRACT

A brake system includes a tandem-type master cylinder, a tandem-type slave cylinder with front and rear fluid pressure chambers and front and rear pistons arranged such that fluid pressure is generated in the fluid pressure chambers when the rear piston is advanced by an actuator, wheel cylinders connected to the fluid pressure chambers of the master cylinder, respectively, and a regulator which regulates a maximum distance between the front and rear pistons. The regulator prevents excessive increase in the volume of the rear fluid pressure chamber.

19 Claims, 14 Drawing Sheets

BRAKE SYSTEM

BACKGROUND OF THE INVENTION

CROSS-REFERENCE TO RELATED APPLICATIONS

The present invention claims priority under 35 USC § 119 based on Japanese patent application No. 2006-334798, filed on Dec. 12, 2006. The subject matter of this priority document is incorporated by reference herein.

1. Field of the Invention

The present invention relates to a brake system comprising a tandem-type master cylinder which generates brake fluid pressure by braking operation by a driver, and a tandem-type slave cylinder which electrically controls an actuator corresponding to the braking operation to generate brake fluid pressure.

2. Description of the Related Art

Japanese Patent No. 3205570 discloses a brake system of the type referred to as a brake by wire (BBW) brake system, which converts a brake operation of a driver into an electrical signal used to operate an electrical fluid pressure generator (slave cylinder), and operates a wheel cylinder by brake fluid pressure generated by the slave cylinder.

In this type of BBW brake system, if/when the slave cylinder fails, brake fluid pressure generated by a master cylinder is used to operate the wheel cylinder. At this time, if one of two braking systems fails and brake fluid leaks, a distance between front and rear pistons sandwiching the tandem-type slave cylinder is increased which increases the volume of a fluid pressure chamber of the other braking system among front and rear fluid pressure chambers, as described later in detail in "DESCRIPTION OF THE PREFERRED EMBODIMENTS", leading to a possibility that a sufficient braking force cannot be generated for the wheel cylinder of the other braking system.

SUMMARY OF THE INVENTION

The present invention has been made in view of the above situation, and an object of the present invention is to provide a BBW brake system in which, when a fluid passage of one of two brake systems fails during braking by brake fluid pressure generated by a master cylinder, a wheel cylinder of the other brake system is reliably operated.

To achieve the above object, according to a first aspect of the present invention, there is provided a brake system comprising: a tandem-type master cylinder including two fluid pressure chambers generating a brake fluid pressure by braking operation by a driver; a tandem-type slave cylinder including a rear fluid pressure chamber and a front fluid pressure chamber electrically generating brake fluid pressure corresponding to the braking operation, and a rear piston and a front piston slidably fitted in the rear of the rear fluid pressure chamber and the front fluid pressure chamber, respectively, the slave cylinder generates the brake fluid pressure in the rear fluid pressure chamber and the front fluid pressure chamber when the rear piston is advanced by an actuator; a wheel cylinder of a first stream connected to one of the fluid pressure chambers of the master cylinder via the rear fluid pressure chamber of the slave cylinder; a wheel cylinder of a second stream connected to the other fluid pressure chamber of the master cylinder via the front fluid pressure chamber of the slave cylinder; and a regulator for regulating a maximum distance between the rear piston and the front piston, wherein the wheel cylinders of the first and second streams are operated by the brake fluid pressure generated by the slave cylinder in a normal operation, and the wheel cylinders of the first and second streams are operated by the brake fluid pressure generated by the master cylinder in an abnormal operation.

With the first aspect of the present invention, at the time of abnormality when the slave cylinder is not be operated, brake fluid pressure generated by one of the fluid pressure chambers of the master cylinder passes through the rear fluid pressure chamber of the slave cylinder to operate the wheel cylinder of the first stream, and the brake fluid pressure generated by the other fluid pressure chamber of the master cylinder passes through the front fluid pressure chamber of the slave cylinder to operate the wheel cylinder of the second stream. At this time, if the fluid passage providing connection between the front fluid pressure chamber of the slave cylinder and the wheel cylinder of the second stream fails, fluid pressure of the front fluid pressure chamber is lost and the front piston advances with respect to the rear piston, thus causing the volume of the rear fluid pressure chamber to be increased, and possibly lowering the brake fluid pressure to be supplied to the wheel cylinder of the first stream. However, because the regulator regulates the maximum distance between the rear piston and the front piston, even if the fluid pressure in the front fluid pressure chamber is lost, it is possible to prevent the increase in the volume of the rear fluid pressure chamber, thereby reliably operating the wheel cylinder of the first stream to secure a sufficient braking force.

According to a second aspect of the present invention, in addition to the first aspect, the regulator comprises: a spring seat fixed to a rear end of the front piston and supporting a front end of a return spring provided under compression between the rear end of the front piston and a front end of the rear piston; and a fastener having one end slidably fitted in a hole formed in a rear end of a guide portion of the spring seat, and an opposite end fixed to the front end of the rear piston.

With the second aspect of the present invention, the front piston and the rear piston can get close to each other because the bolt slides through the hole in the spring seat, and the maximum distance between the front piston and the rear piston can be regulated because the head of the bolt is engaged with the hole in the spring seat.

According to a third aspect of the present invention, in addition to the second aspect, the front end of the spring seat is fixed to the rear end of the front piston by engaging an annular crimping portion provided at the front end of the spring seat with an outer periphery of an annular projection provided at the rear end of the front piston.

According to a fourth aspect of the present invention, in addition to the second aspect, the front end of the spring seat is fixed to the rear end of the front piston by a pin fitted in openings defined through the front end of the spring seat and the rear end of the front piston.

According to a fifth aspect of the present invention, in addition to the second aspect, the front end of the spring seat is fixed to the rear end of the front piston by engaging a crimping portion provided at the front end of the spring seat with a groove provided at the rear end of the front piston.

According to a sixth aspect of the present invention, in addition to the second aspect, the front end of the spring seat is fixed to the rear end of the front piston by a U-shaped key engaged in a pair of grooves provided in the front end of the spring seat and a pair of grooves provided in the rear end of the front piston.

The above-mentioned object, other objects, characteristics, and advantages of the present invention will become apparent from preferred embodiments, which will be described in detail below by reference to the attached drawings.

BRIEF DESCRIPTION OF THE DRAWINGS

FIG. 1 is a fluid-pressure circuit diagram of a vehicle brake system under normal operation;

FIG. 2 is a fluid-pressure circuit diagram of a vehicle brake system under abnormal operation corresponding to FIG. 1;

FIG. 3 is a cross sectional view of a slave cylinder;

FIG. 4 is a perspective view of both a rear piston and a front piston; and

FIG. 5 is a cross-sectional view of a slave cylinder showing the operation without using a regulator.

FIG. 6 is a cross sectional view of a rear piston and a front piston;

FIG. 7 is an enlarged sectional view taken along line 7-7 in FIG. 6; and

FIG. 8 is a perspective view of both the rear piston and the front piston.

FIG. 9 is a cross sectional view of a rear piston and a front piston;

FIG. 10 is an enlarged sectional view taken along line 10-10 in FIG. 9; and

FIG. 11 is a perspective view of both the rear piston and the front piston.

FIG. 12 is a cross sectional view of a rear piston and a front piston;

FIG. 13 is an enlarged sectional view taken along line 12-12 in FIG. 13; and

FIG. 14 is a perspective view of both the rear piston and the front piston.

DESCRIPTION OF THE PREFERRED EMBODIMENTS

A first embodiment according to the present invention will be described below based on FIGS. 1 to 5.

Figure 1:
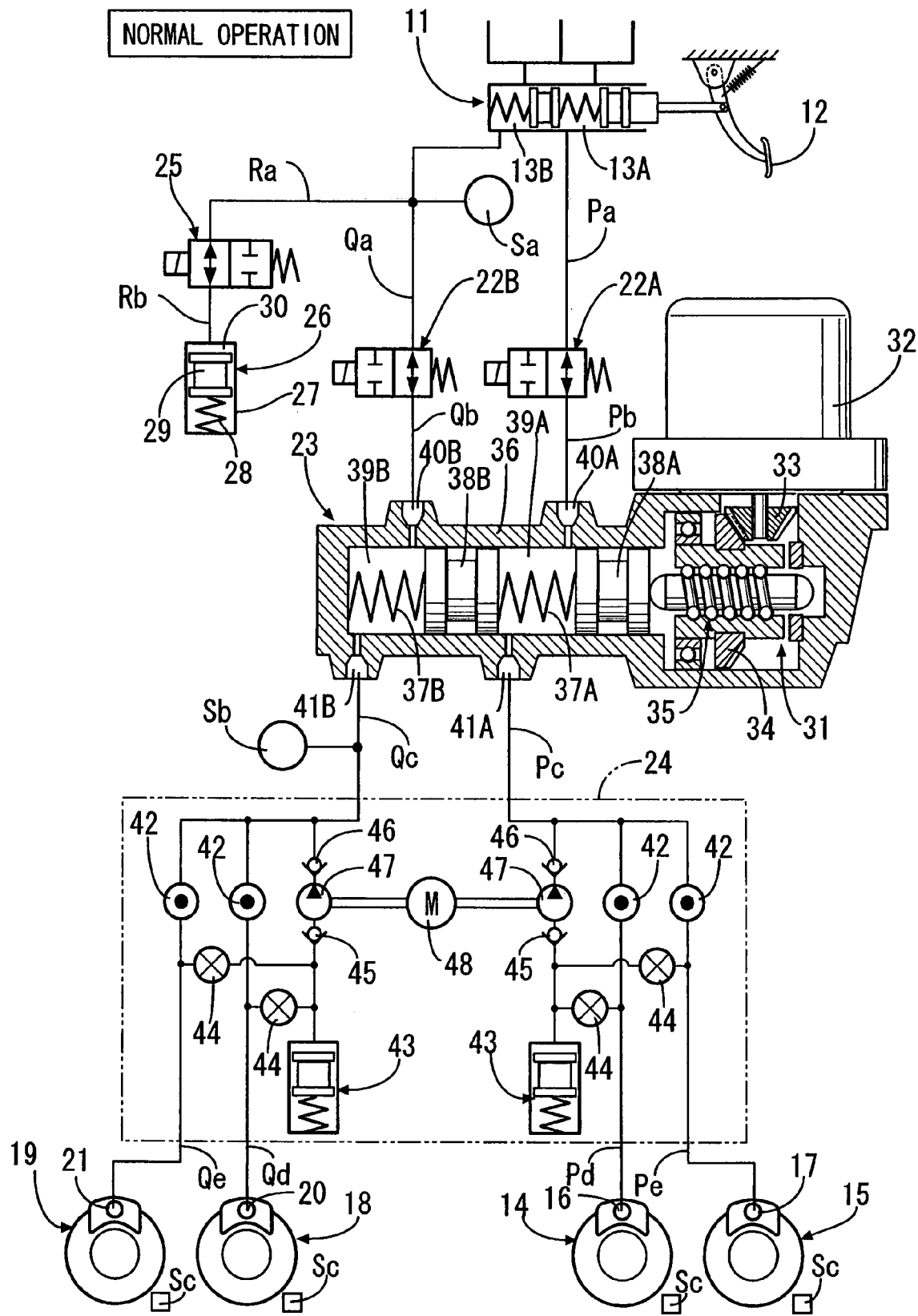
FIGS. 1 to 5 show a first embodiment according to the present invention.

As shown in FIG. 1, a tandem master cylinder 11 has two fluid pressure chambers 13A and 13B which output brake fluid pressure according to a force applied to a brake pedal 12 by a driver treading on the brake pedal 12. One of the fluid pressure chambers 13A is connected to wheel cylinders 16 and 17 of disc brake devices 14 and 15 for braking, for example, a left front wheel and a right rear wheel through fluid passages Pa, Pb, Pc, Pd, and Pe (first stream). The other fluid pressure chamber 13B is connected to wheel cylinders 20 and 21 of disc brake devices 18 and 19 for braking, for example, a right front wheel and a left rear wheel through fluid passages Qa, Qb, Qc, Qd, and Qe (second stream).

A shutoff valve 22A, which is a normally open solenoid valve, is provided between the fluid passages Pa and Pb. A shutoff valve 22B, which is a normally open solenoid valve, is provided between the fluid passages Qa and Qb. A slave cylinder 23 is provided between the fluid passages Pb, Qb and the fluid passages Pc, Qc. An ABS 24 is provided between the fluid passages Pc, Qc and the fluid passages Pd, Pe; Qd, Qe.

A reaction force permission valve 25, which is a normally closed solenoid valve, is connected between a fluid passage Ra branching from the fluid passage Qa and a fluid passage Rb. A stroke simulator 26 is connected to the fluid passage Rb. The stroke simulator 26 has a cylinder 27 and a piston 29 slidably fitted in the cylinder 27 while being urged by a spring 28. A fluid pressure chamber 30, formed on the side of the piston 29 opposite from the spring 28, communicates with the fluid passage Rb.

An actuator 31 of the slave cylinder 23 has a drive bevel gear 33 provided on the output shaft of an electric motor 32, a follower bevel gear 34 meshing with the drive bevel gear 33, and a ball screw mechanism 35 operated by the follower bevel gear 34. A pair of front and rear pistons 38A and 38B urged in a retreat direction by a pair of return springs 37A and 37B are slidably disposed in a cylinder body 36 of the slave cylinder 23. A rear fluid pressure chamber 39A and a front fluid pressure chamber 39B are defined on the front faces of the rear piston 38A and the front piston 38B, respectively. The rear fluid pressure chamber 39A communicates with the fluid passages Pb, Pc via ports 40A, 41A, while the front fluid pressure chamber 39B communicates with the fluid passages Qb, Qc through ports 40B, 41B.

When the electric motor 32 is driven in one direction, the rear and the front pistons 38A and 38B are advanced by the drive bevel gear 33, the follower bevel gear 34, and the ball screw mechanism 35. At a moment when the ports 40A and 40B communicating with the fluid passages Pb, Qb are closed, the brake fluid pressure is generated in the rear and front fluid chambers 39A and 39B, and the brake fluid pressure is outputted to the fluid passages Pc and Qc through the ports 41A and 41B.

Figure 3:
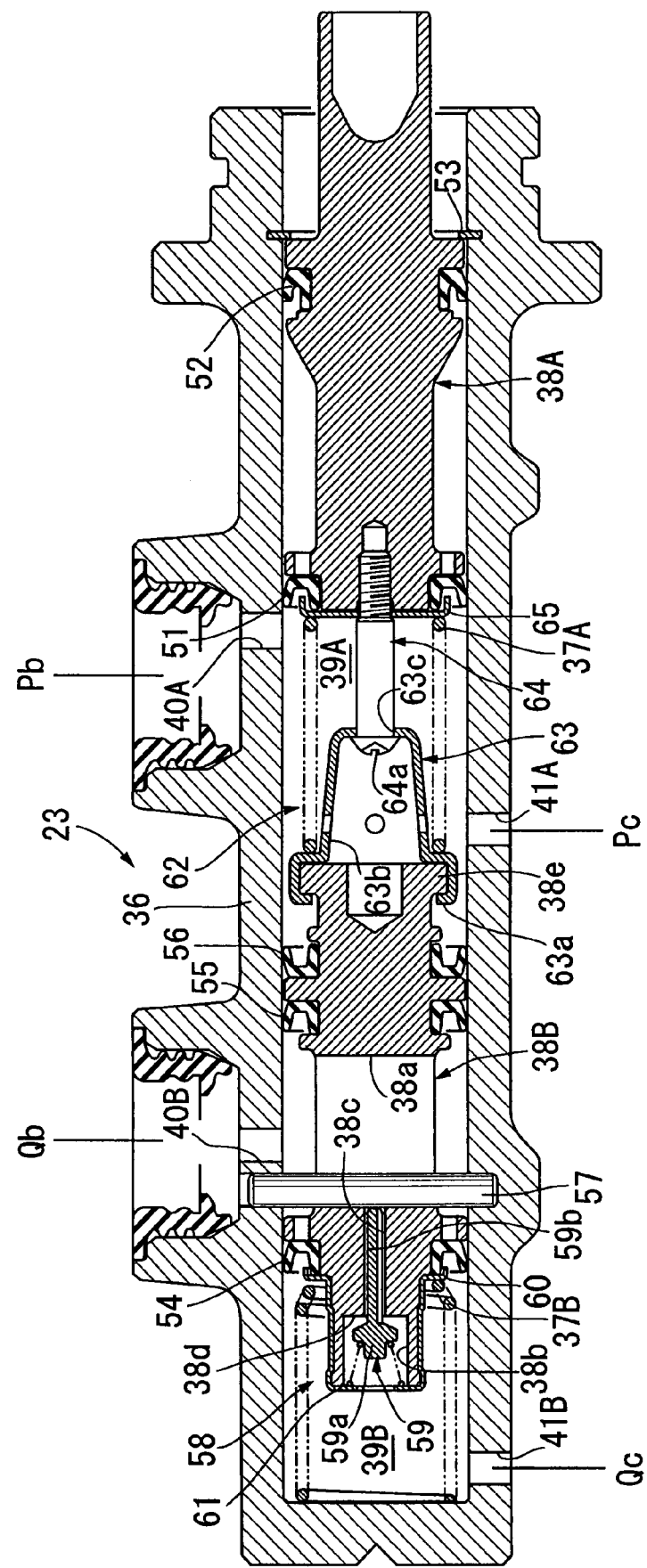
Figure 4:
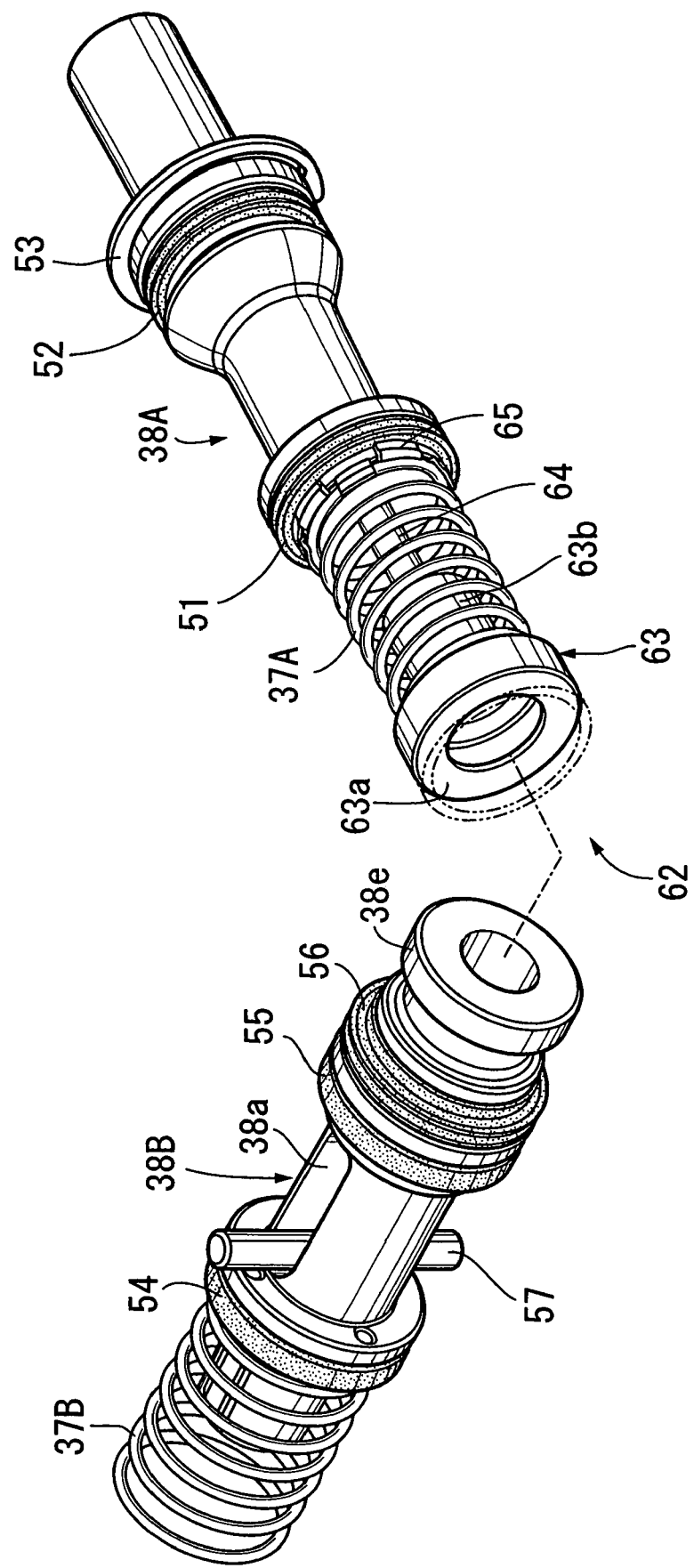

As is obvious from FIGS. 3 and 4, the rear piston 38A is slidably fitted in the rear of the cylinder body 36 of the slave cylinder 23, and comprises a front first cup seal 51 and a rear second cup seal 52. In a state where the rear piston 38A is stopped by a circlip 53 at the retreating end, the port 40A leading to the fluid passage Pb is opened to the rear fluid pressure chamber 39A in front of the first cup seal 51. At a moment when the rear piston 38A slightly advances and the first cup seal 51 passes beyond the port 40A, the brake fluid pressure is generated in the rear fluid pressure chamber 39A.

The front piston 38B is slidably fitted to the front of the cylinder body 36 of the slave cylinder 23, and comprises a front third cup seal 54, and rear fourth and fifth cup seals 55 and 56. A pin 57 fixed to the cylinder body 36 is slidably fitted in a long hole 38a extending in the diameter direction between the third cup seal 54 and the fourth cup seal 55. An opening/closing valve 58 provided in the front piston 38B comprises: a communication hole 38c providing communication between a recess 38b formed in the front end of the front piston 38B and the long hole 38a; a valve seat 38d formed in a portion where the communication hole 38c is opened to the recess 38b; a valve body 59 having a head 59a opposed to a valve seat 38d so that the head 59a can be seated thereon, and a leg portion 59b slidably fitted in the communication hole 38c; a spring seat 60 fitted to the front end of the front piston 38B; and a valve spring 61 provided under compression between the spring seat 60 and the head 59a of the valve body 59.

The front piston 38B is urged rearward by the return spring 37B, and limited at the retreating end where the front end of the long hole 38a contacts the pin 57. In this state, the leg portion 59b of the valve body 59 is brought into contact with the pin 57 and the head 59a is separated from the valve seat 38d, so that the front fluid pressure chamber 39B communicates with a rear chamber between the third and fourth cup seals 54 and 55 through the communication hole 38*c*. When the front piston 38B slightly advances, the valve body 59 having the leg portion 59*b* guided by the communication hole 38*c* is urged rearward by a repulsive force of the valve spring 61, so that the head 59*a* is seated on the valve seat 38*d* to generate brake fluid pressure in the front fluid pressure chamber 39B.

In order to generate the brake fluid pressure by reducing the volume of the rear fluid pressure chamber 39A, the rear piston 38A is capable of approaching the front piston 38B, but the maximum distance therebetween is regulated by a regulator 62. As will be understood, the regulator is a spring-biased sliding connector. The regulator 62 comprises a spring seat 63 and a bolt 64. The spring seat 63 is fixed via a crimping portion 63*a* to an annular projection 38*e* formed at the rear end of the front piston 38B. The bolt 64 has a head 64*a* engaged in a hole 63*c* in the rear end of a guide portion 63*b* extending cylindrically rearward from the crimping portion 63*a*, and a rear end screwed into the front end of the rear piston 38A so as to fix a spring seat 65 to the rear piston 38A.

Normally, the rear piston 38A and the front piston 38B are urged in directions away from each other by a repulsive force of the return spring 37A provided under compression between the front and rear spring seats 63 and 65; and the head 64*a* of the bolt 64 is brought into contact with the periphery of the hole 63*c* of the spring seat 63 so that the distance between the rear piston 38A and the front piston 38B are regulated to the maximum distance. However, the rear piston 38A can approach the front piston 38B because the bolt 64 slides through the hole 63*c*.

As shown in FIG. 1, the structure of the ABS 24 is of a well-known type. The ABS 24 has two streams structurally identical to each other: a first stream including the disc brake devices 14 and 15 for braking the left front wheel and the right rear wheel; and a second stream for the disc brake devices 18 and 19 for braking the right front wheel and the left rear wheel. Of these streams, the first stream for the disc brake devices 14 and 15 will be described as a representative. A pair of in-valves 42 comprising normally open solenoid valves are provided between the fluid passage Pc and the fluid passages Pd, Pe. A pair of out-valves 44 comprising normally closed solenoid valves are provided between the fluid passages Pd, Pe on the downstream side of the in-valves 42 and a reservoir 43. A fluid pressure pump 47 interposed between a pair of check valves 45 and 46 is provided between the reservoir 43 and the fluid passage Pc. The fluid pressure pump 47 is driven by an electric motor 48.

Connected to an electronic control unit (not shown) for controlling the operation of the shutoff valves 22A and 22B, the reaction force permission valve 25, the slave cylinder 23 and the ABS 24, are a fluid pressure sensor Sa for detecting the brake fluid pressure generated by the master cylinder 11, a fluid pressure sensor Sb for detecting the brake fluid pressure transmitted to the disc brake devices 18 and 19, and a vehicle wheel speed sensors Sc for detecting the vehicle wheel speeds of the vehicle wheels.

The operation of the first embodiment of the present invention having the above-described arrangement will now be described.

In a normal operation of the system according to a first aspect, the shutoff valves 22A and 22B, comprising normally open solenoid valves, are demagnetized so as to be in an open state, and the reaction force permission valve 25, comprising a normally closed solenoid valve, is magnetized so as to be in an open state. In this state, when the fluid pressure sensor Sa provided in the fluid passage Qa detects a depression on the brake pedal 12 by the driver, the actuator 31 of the slave cylinder 23 operates to advance the rear and front pistons 38A and 38B, thereby generating brake fluid pressure in the rear and front fluid chambers 39A and 39B. This brake fluid pressure is transmitted to the wheel cylinders 16, 17, 20, and 21 of the disc brake devices 14, 15, 18, and 19 through the opened in-valves 42 of the ABS 24, thereby braking the vehicle wheels.

When the rear and front pistons 38A and 38B of the slave cylinder 23 slightly advance, the communication between the fluid passages Pb, Qb and the rear and front fluid chambers 39A and 39B are shut off. Therefore, the brake fluid pressure generated by the master cylinder 11 is not transmitted to the disc brake devices 14, 15, 18, and 19. At this time, the brake fluid pressure generated in the other fluid pressure chamber 13B of the master cylinder 11 is transmitted to the fluid pressure chamber 30 of the stroke simulator 26 through the opened reaction force permission valve 25 to move the piston 29 against the spring 28, thereby generating a pseudo pedal reaction force while permitting the stroke of the brake pedal 12 to eliminate an uncomfortable feeling to the driver.

The operation of the actuator 31 for the slave cylinder 23 is controlled so that the brake fluid pressure generated by the slave cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 according to the depressing force input to the brake pedal 12 by the driver.

If slip ratio of any vehicle wheel is increased and a tendency of locking is detected based on the output from the wheel speed sensor Sc corresponding to the vehicle wheel during the above-described braking, the shutoff valves 22A and 22B, comprising normally open solenoid valves, are energized so as to close, the slave cylinder 23 is maintained in the operating state, and in this state the ABS 24 is operated to prevent locking of the vehicle wheel.

That is, when any vehicle wheel has a tendency of locking, a pressure reducing operation is performed to release the brake fluid pressure in the wheel cylinder by opening the out-valve 44 in a state where the transmission of the brake fluid pressure from the slave cylinder 23 is shut off by closing the in-valve 42 communicating with the wheel cylinder; and a pressure maintaining operation is subsequently performed to maintain the brake fluid pressure in the wheel cylinder by closing the out-valve 44, thereby reducing the braking force to avoid locking of the vehicle wheel.

When the vehicle wheel speed is recovered to reduce the slip ratio, a pressure increasing operation is performed to increase the brake fluid pressure in the wheel cylinder by opening the in-valve 42, thereby increasing the braking force for braking the vehicle wheel. When the vehicle wheel again has a tendency of locking due to this pressure increasing operation, the above-described pressure reducing, maintaining and increasing operation is performed again. The operation is repeatedly performed to generate the maximum braking force while preventing locking of the vehicle wheels. The brake fluid flowing into the reservoir 43 during this process is returned by the fluid pressure pump 47 to the fluid passages Pc and Qc on the upstream side.

During the above-described ABS control, the shutoff valves 22A and 22B are maintained in the valve closed state, thereby preventing a fluid pressure fluctuation associated with the operation of the ABS 24 from being transmitted as a kickback from the master cylinder 11 to the brake pedal 12.

Figure 2:
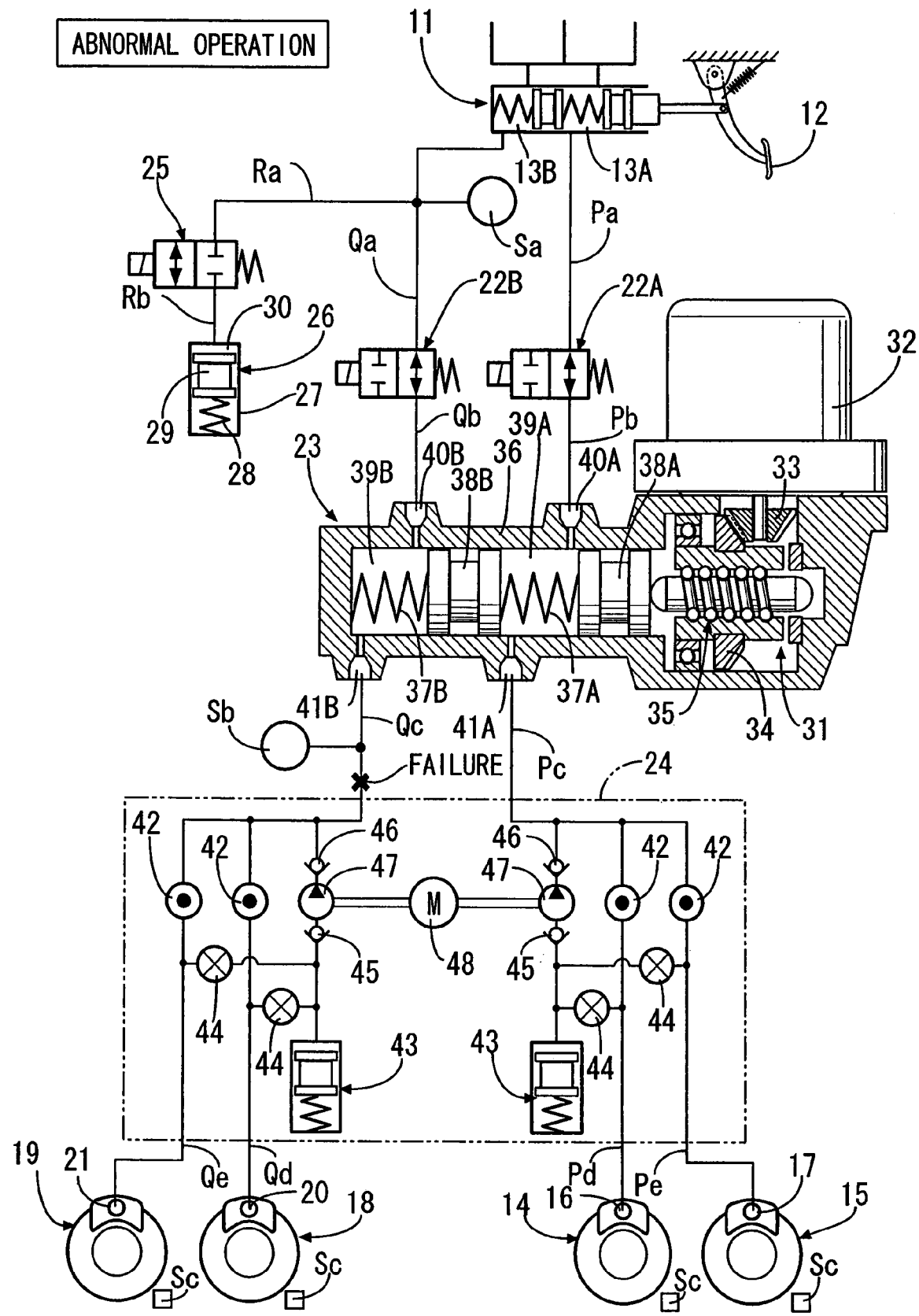

In the event of power failure, as shown in FIG. 2, the shutoff valves 22A and 22B, comprising normally open solenoid valves, remain open; the reaction force permission valve 25 comprising a normally closed solenoid valve is automatically closed; the in-valves 42, comprising normally open solenoid valves, are automatically opened; and the out-valves 44, comprising normally closed solenoid valves, are automatically closed. In this state, the brake fluid pressure generated in the two fluid chambers 13A and 13B of the master cylinder 11 passes through the shutoff valves 22A and 22B, the fluid chambers 39A and 39B of the slave cylinder 23 and the in-valves 42, without being absorbed by the stroke simulator 26; and operates the wheel cylinders 16, 17, 20, and 21 of the disc brake devices 14, 15, 18, and 19 for respectively braking the vehicle wheels, thus generating the braking force without any problem.

The following description refers to a failure which occurs in the second stream. However it will be understood that a similar failure may occur in the first stream. To avoid redundancy, only a failure in the second stream will be described, with the understanding that a failure in the first stream would function in the same manner.

Figure 5:
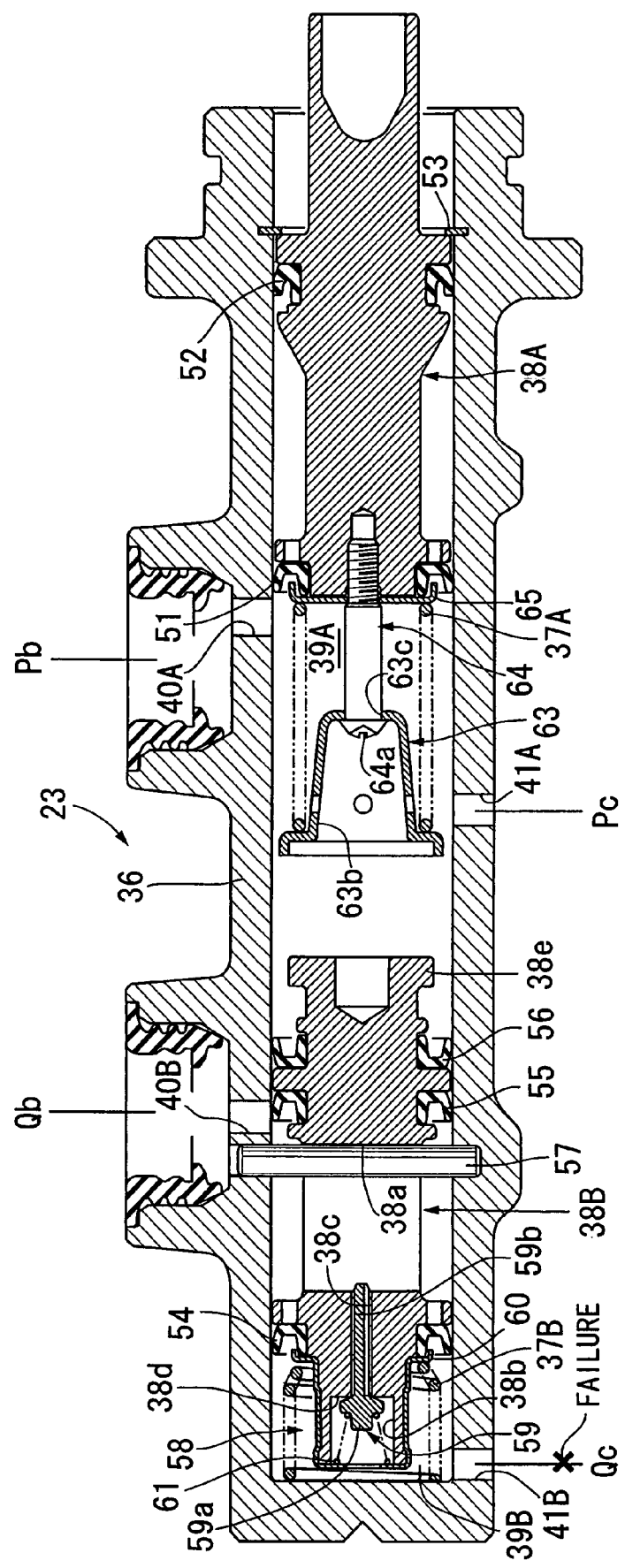

If a failure occurs, in the above-mentioned time of abnormality, at any position (for example, a position marked with a cross in FIG. 2) in the fluid passages Qc, Qd, Qe providing connection between the front fluid pressure chamber 39B of the slave cylinder 23 and the wheel cylinders 20, 21 of the second stream, and the brake fluid leaks, the following problem occurs in the case where the slave cylinder 23 does not have the regulator 62 as shown in FIG. 5.

If the fluid passage Qc fails, for example, the brake fluid pressure of the front fluid pressure chamber 39B is lost, the front piston 38B is advanced to the advance limit (position where the rear end of the long hole 38a is brought into contact with the pin 57) by the brake fluid pressure transmitted from one fluid pressure chamber 13A of the master cylinder 10 to the rear fluid pressure chamber 39A. As a result, the volume of the rear fluid pressure chamber 39A is increased to lower the brake fluid pressure in the fluid passages Pc, Pd, Pe providing connection between the rear fluid pressure chamber 39A and the wheel cylinders 15, 16 of the first stream. Therefore, there is a possibility that the pedal stroke of the brake pedal 12 is increased, or the braking force of the wheel cylinders 15, 16 of the first stream is decreased.

However, according to a first embodiment of the present invention, as shown in FIG. 3, the rear piston 38A and the front piston 38B are connected to each other through the regulator 62, and thus the advance of the front piston 38B is suppressed to prevent an increase in the volume of the rear fluid pressure chamber 39A. Thus, it is possible to reliably operate the wheel cylinders 15, 16 of the first stream by the brake fluid pressure generated in one fluid pressure chamber 13A of the master cylinder 11.

Figure 6:
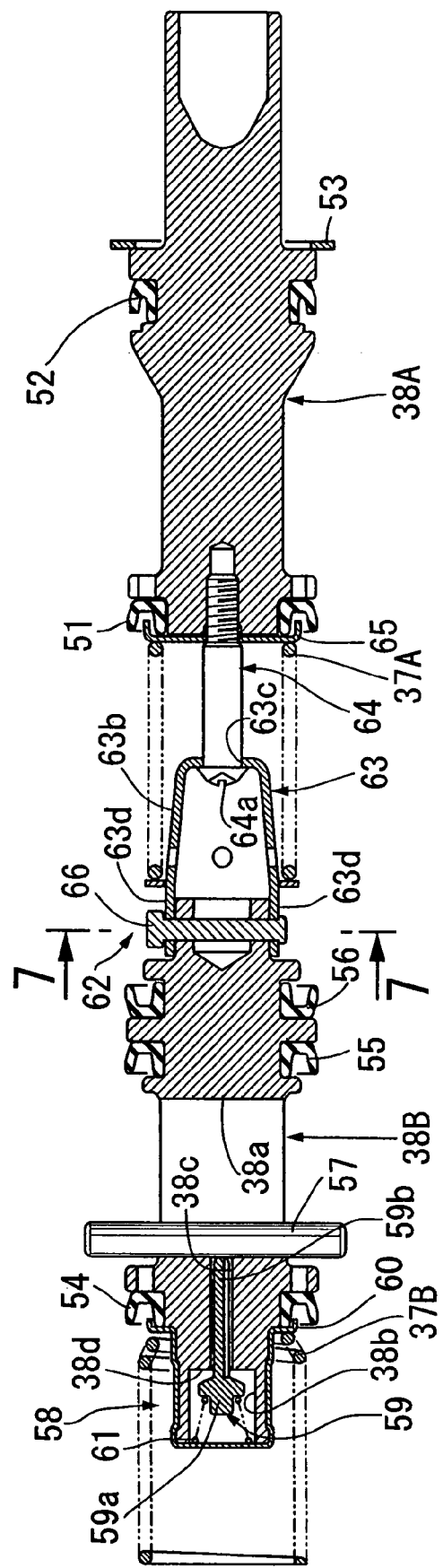
FIGS. 6 to 8 show a second embodiment according to the present invention.
Figure 7:
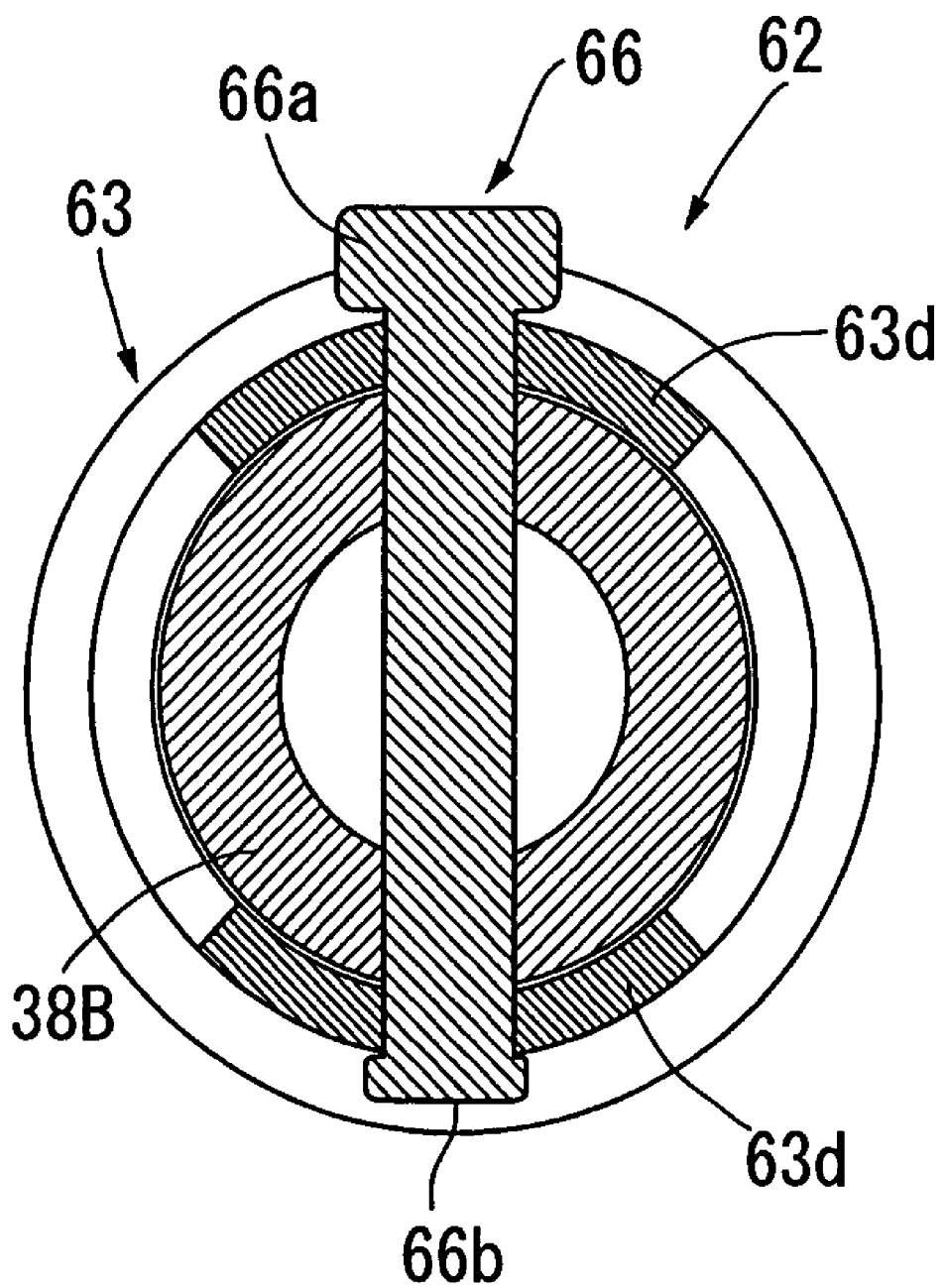
Figure 8:
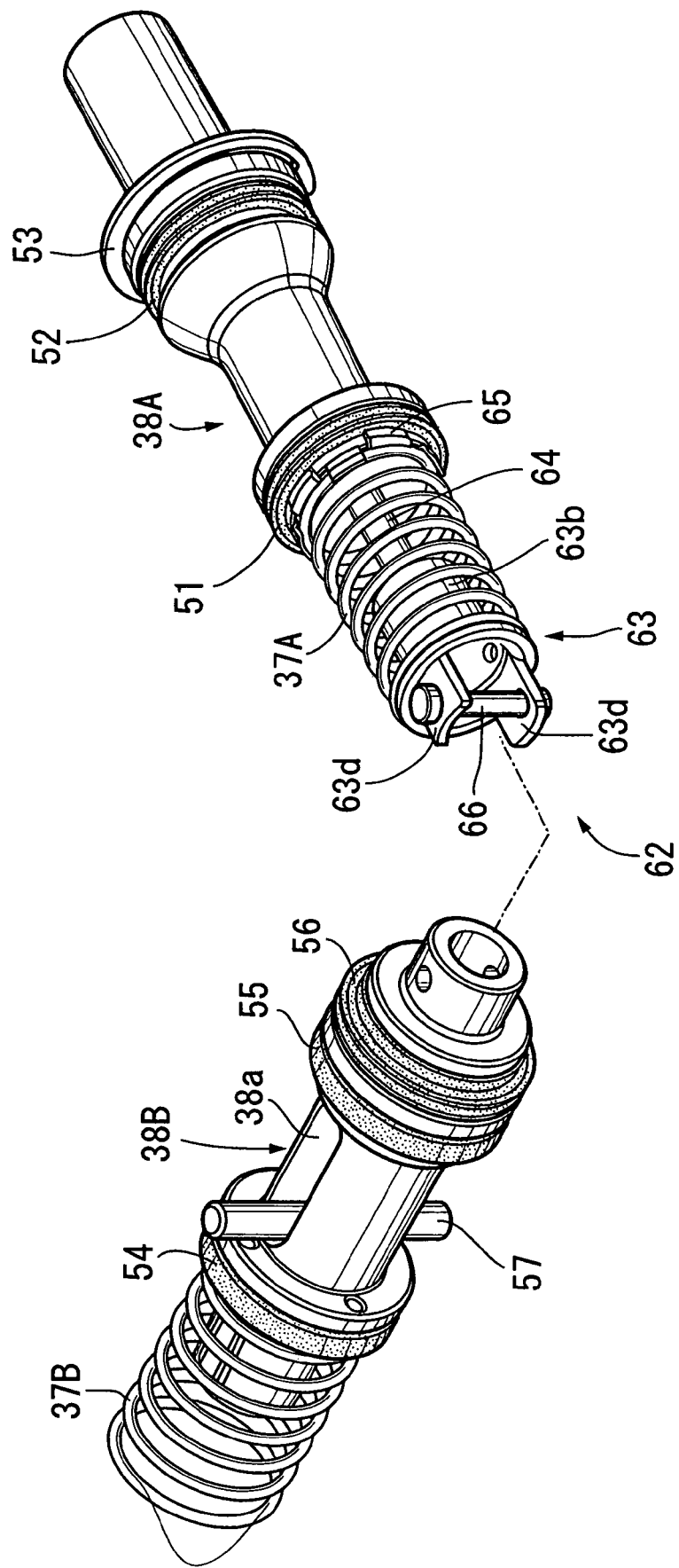

Next, a second embodiment of the present invention will be described based on FIGS. 6 to 8.

In the regulator 62 of the second embodiment, the pair of connections 63d, 63d projecting forward from the guide portion 63b of the spring seat 63 are fitted to the rear end of the front piston 38B, and the connections 63d, 63d and the rear end of the front piston 38B are coupled together by a pin 66. The pin 66 is prevented from being pulled off by a head 66a formed at one end thereof and a crimping portion 66b formed at the other end thereof.

Figure 9:
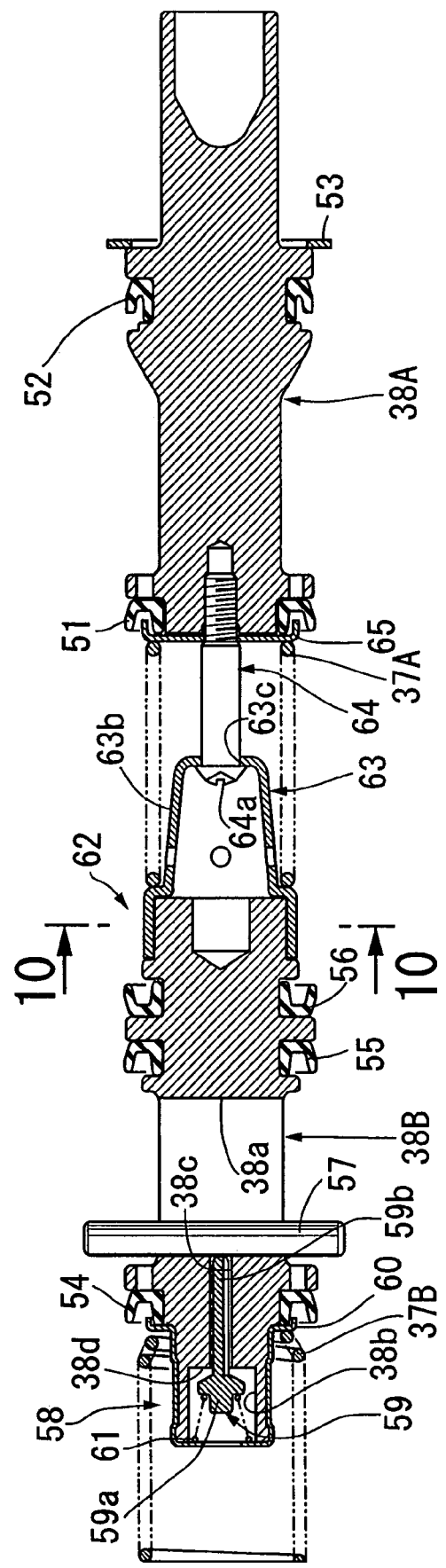
FIGS. 9 to 11 show a third embodiment according to the present invention.
Figure 10:
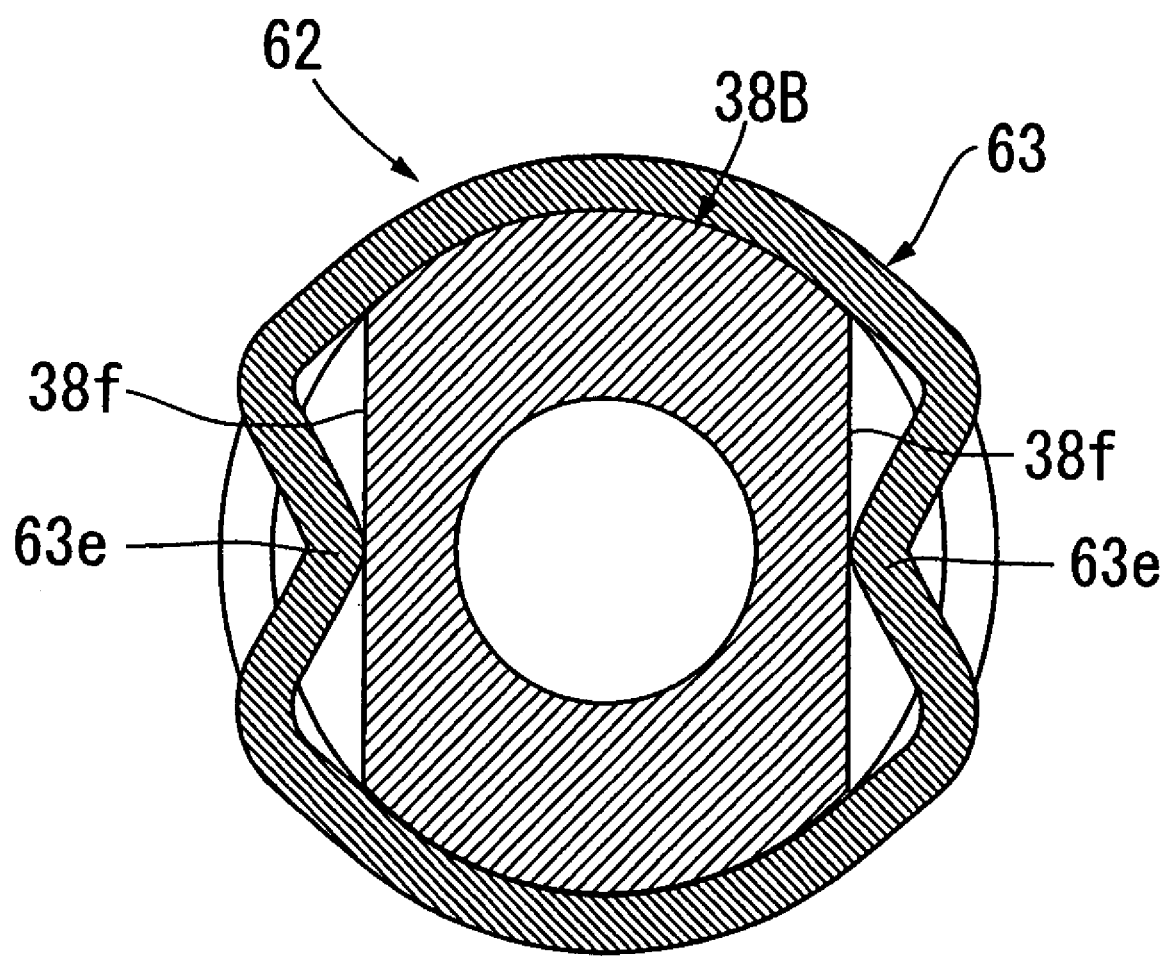
Figure 11:
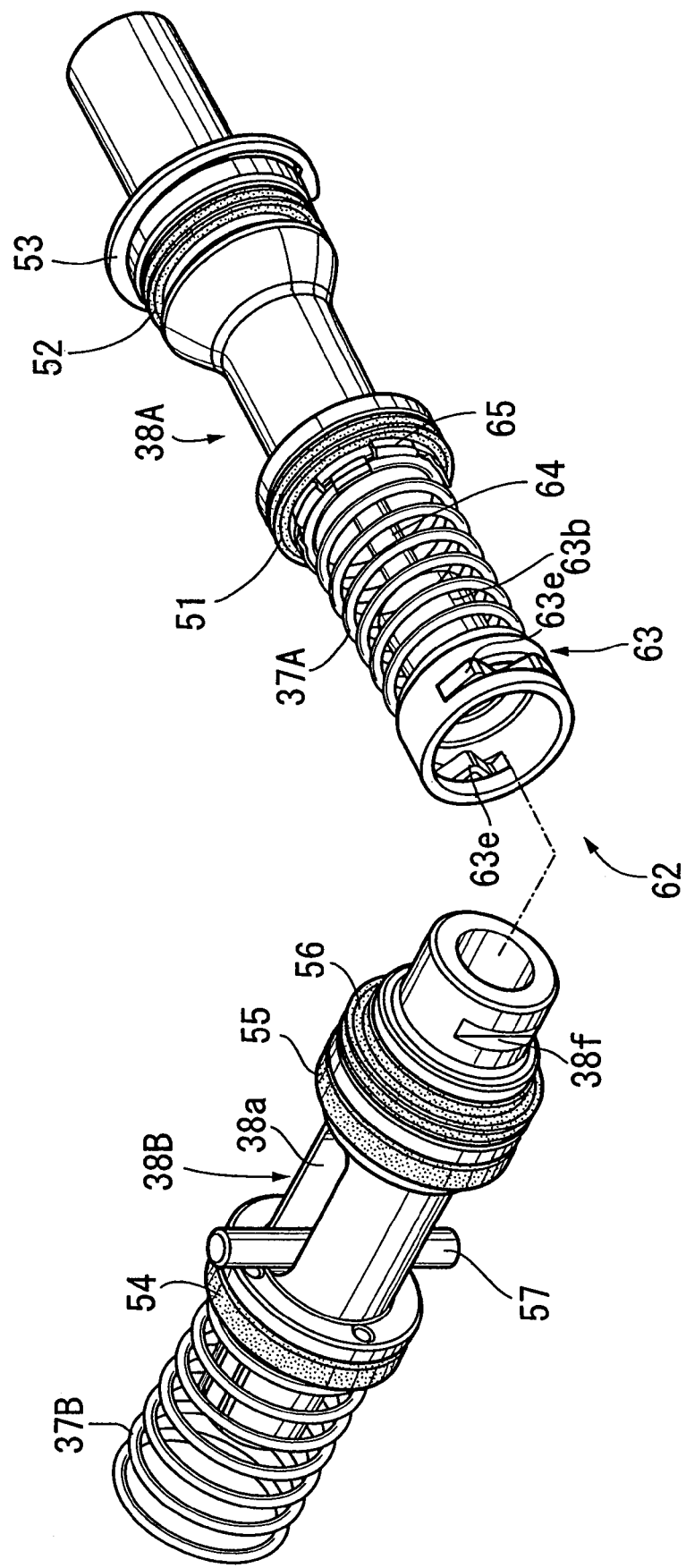

Next, a third embodiment of the present invention will be described based on FIGS. 9 to 11.

In the regulator 62 of the third embodiment, a pair of grooves 38f, 38f are formed in the rear end of the front piston 38B; a pair of crimping portions 63e, 63e are formed by cutting and raising the front end of the cylindrical guide portion 63b of the spring seat 63; and the crimping portions 63e, 63e are engaged in the grooves 38f, 38f of the front piston 38B, thereby coupling the spring seat 63 to the front piston 38B.

Figure 12:
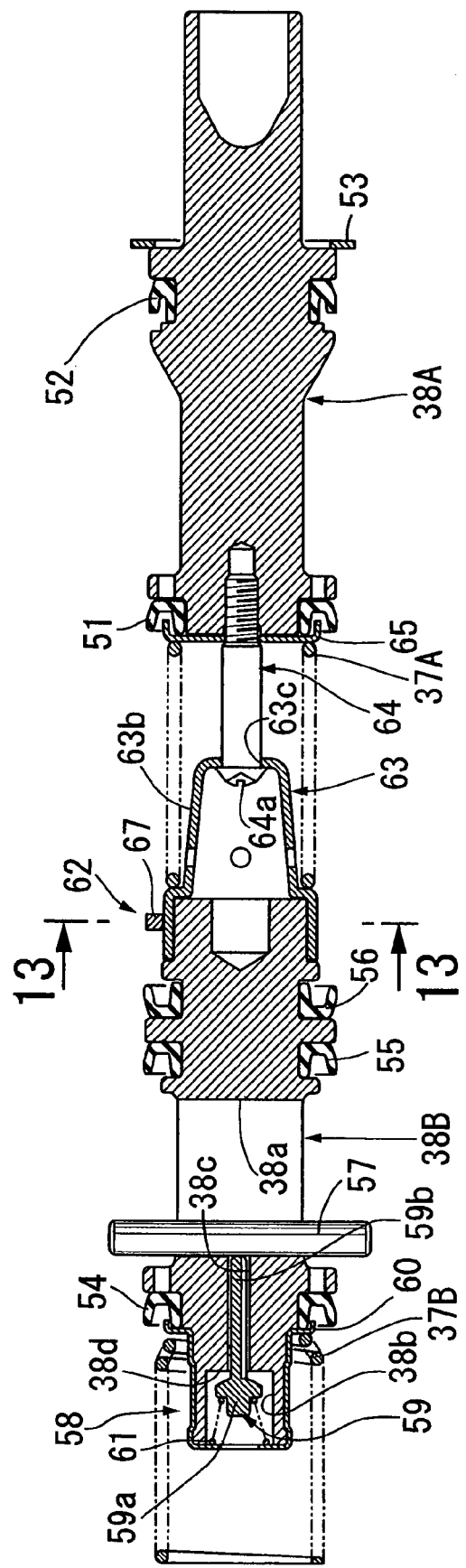
FIGS. 12 to 14 show a fourth embodiment according to the present invention.
Figure 13:
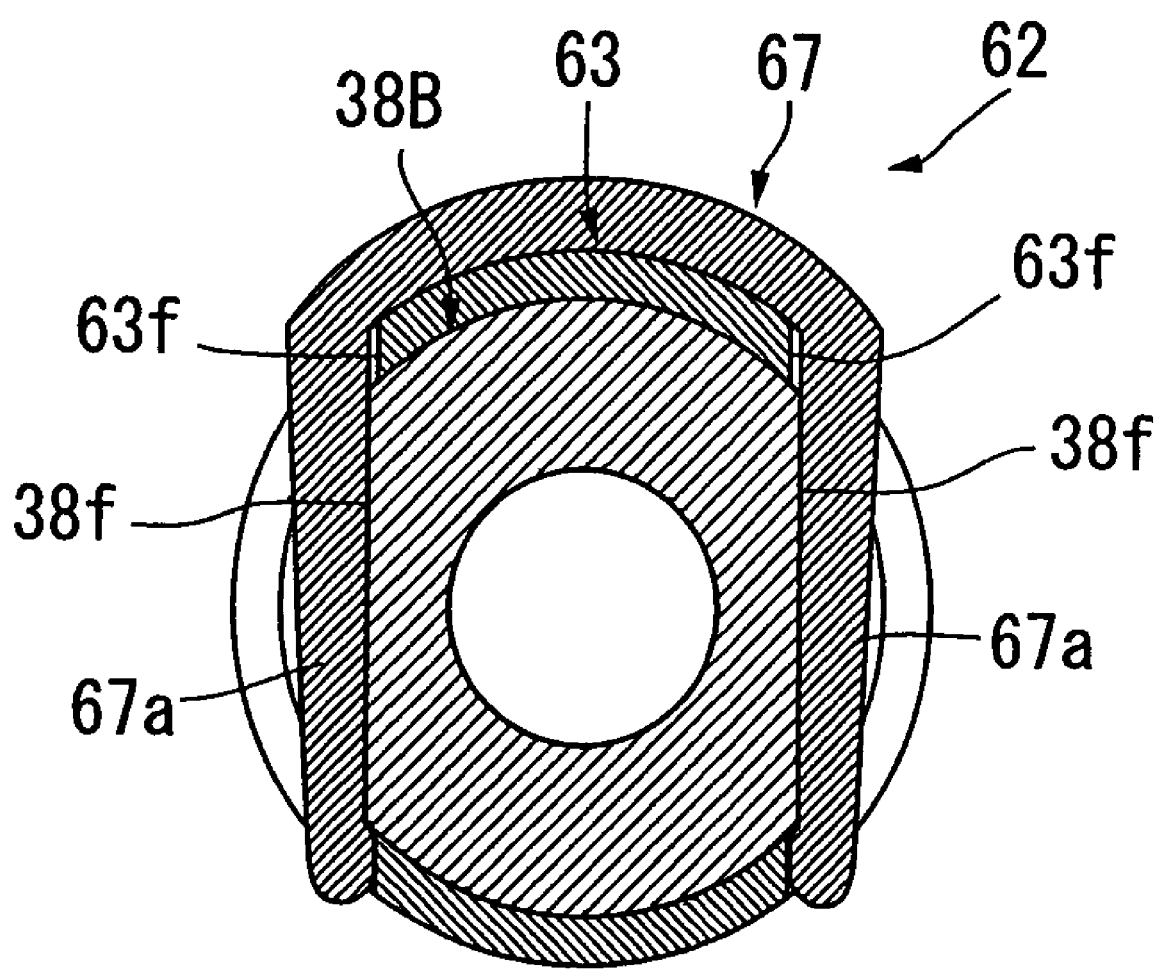
Figure 14:
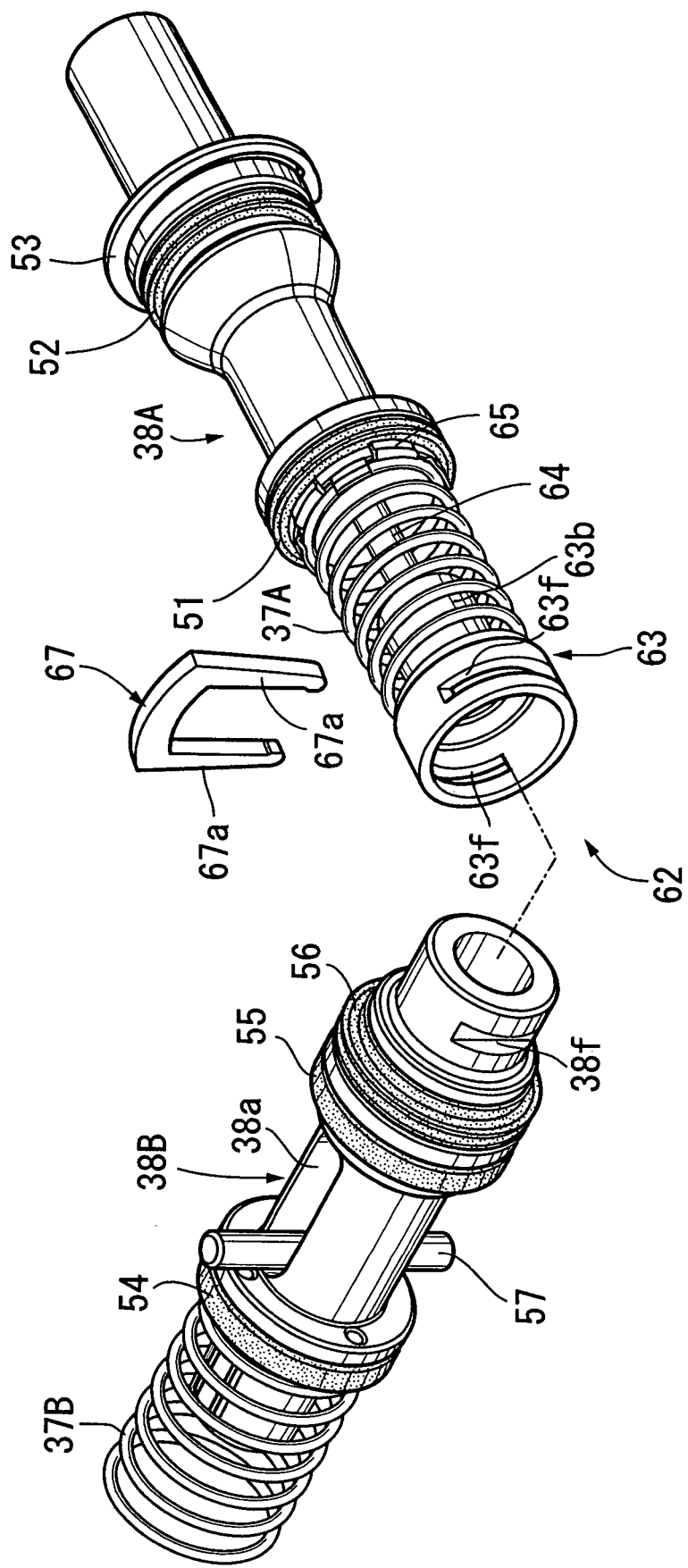

Next, a fourth embodiment of the present invention will be described based on FIGS. 12 to 14.

The fourth embodiment uses a U-shaped key 67 instead of the pin 66 as used in the second embodiment. Two leg portions 67a, 67a of the key 67 are engaged in the pair of grooves 63f, 63f of the spring seat 63 and the pair of grooves 38f, 38f of the front piston 38B, thereby coupling the spring seat 63 to the front piston 38B.

The above-described second to fourth embodiments also achieve the same action effects as those in the first embodiment.

The embodiments of the present invention have been described above, but various changes in design may be made without departing from the subject matter of the present invention as indicated by the appended claims.

For example, the fluid pressure circuit in the embodiments comprises the shutoff valves 22A, 22B, but if the kickback is tolerated during the ABS control, the shutoff valves 22A, 22B may be eliminated to reduce the number of parts.

What is claimed is:

1. A brake-by-wire brake system comprising:
   a tandem-type master cylinder including two fluid pressure chambers for generating a brake fluid pressure in response to a braking operation by a driver;
   a tandem-type slave cylinder including:
      a cylinder body having a rear fluid pressure chamber and a front fluid pressure chamber formed therein for electrically generating brake fluid pressure corresponding to the braking operation,
      a rear piston and a front piston slidably fitted in the rear of the rear fluid pressure chamber and the front fluid pressure chamber, respectively, and
      a regulator disposed in the cylinder body, the regulator operatively attached to and operatively interconnecting the front and rear pistons,
   wherein the slave cylinder generates the brake fluid pressure in the rear fluid pressure chamber and the front fluid pressure chamber when the rear piston is advanced by an actuator;
   wherein a wheel cylinder of a first stream is connected to one of the fluid pressure chambers of the master cylinder via the rear fluid pressure chamber of the slave cylinder;
   wherein a wheel cylinder of a second stream is connected to the other fluid pressure chamber of the master cylinder via the front fluid pressure chamber of the slave cylinder; and
   wherein the regulator is configured and arranged to limit a maximum distance between the rear piston and the front piston of the slave cylinder, and thereby to limit a maximum volume of a pressurized one of the first and second pressure chambers in the event of a pressure loss in the other pressure chamber,
   and wherein the wheel cylinders of the first and second streams are operated by the brake fluid pressure generated by the slave cylinder in a normal operation of the system, and the wheel cylinders of the first and second streams are operated by the brake fluid pressure generated by the master cylinder in an abnormal operation of the system.

2. The brake system according to claim 1, wherein the regulator comprises:
   a spring seat fixed to a rear end of the front piston and supporting a front end of a return spring provided under compression between the rear end of the front piston and a front end of the rear piston;

and a fastener having one end slidably fitted in a hole formed in a rear end of a guide portion of the spring seat, and an opposite end fixed to the front end of the rear piston.

3. The brake system according to claim 2, wherein the front end of the spring seat is fixed to the rear end of the front piston by engaging an annular crimping portion provided at the front end of the spring seat with an outer periphery of an annular projection provided at the rear end of the front piston.

4. The brake system according to claim 2, wherein the front end of the spring seat is fixed to the rear end of the front piston by a pin fitting in openings defined through the front end of the spring seat and the rear end of the front piston.

5. The brake system according to claim 2, wherein the front end of the spring seat is fixed to the rear end of the front piston by engaging a crimping portion provided at the front end of the spring seat with a groove provided at the rear end of the front piston.

6. The brake system according to claim 2, wherein the front end of the spring seat is fixed to the rear end of the front piston by a U-shaped key engaged in a pair of grooves provided in the front end of the spring seat and a pair of grooves provided in the front piston.

7. The brake system according to claim 2, wherein the fastener is a bolt which has a head slidably fitted in the hole formed in a rear end of a guide portion of the spring seat, and a rear end screwed in to the front end of the rear piston.

8. A brake-by-wire brake system comprising:

a tandem-type master cylinder including two fluid pressure chambers for generating a brake fluid pressure in response to a braking operation by a driver;

a tandem-type slave cylinder including:
    a cylinder body having a rear fluid pressure chamber and a front fluid pressure chamber formed therein for electrically generating brake fluid pressure corresponding to the braking operation;
    a rear piston and a front piston slidably fitted in the rear of the rear fluid pressure chamber and the front fluid pressure chamber, respectively, and
    a regulator disposed in the cylinder body, the regulator operatively attached to and operatively interconnecting the front and rear pistons, wherein the slave cylinder is capable of generating the brake fluid pressure in the rear fluid pressure chamber and the front fluid pressure chamber by advancing the rear piston by an actuator;

wherein a wheel cylinder of a first stream is connected to one of the fluid pressure chambers of the master cylinder via the rear fluid pressure chamber of the slave cylinder;

wherein a wheel cylinder of a second stream is connected to the other fluid pressure chamber of the master cylinder via the front fluid pressure chamber of the slave cylinder; and wherein the regulator comprises a spring-biased sliding connector between the rear piston and the front piston, which establishes a maximum distance between the pistons of the slave cylinder, thereby to limit a maximum volume of a pressurized one of the first and second pressure chambers in the event of a pressure loss in the other pressure chamber;

wherein the wheel cylinders of the first and second streams are operated by the brake fluid pressure generated by the slave cylinder in a normal operation of the system, and the wheel cylinders of the first and second streams are operated by the brake fluid pressure generated by the master cylinder in an abnormal operation of the system.

9. The brake system according to claim 8, wherein the spring-biased sliding connector comprises:

a spring seat disposed at a rear end of the front piston and supporting a front end of a return spring provided under compression between the rear end of the front piston and a front end of the rear piston;

a first fastener fixed to a rear end of the front piston and operatively interconnecting the spring seat and the rear end of the front piston; and a second fastener having one end slidably fitted in a hole formed in a rear end of a guide portion of the spring seat, and an opposite end fixed to the front end of the rear piston.

10. The brake system according to claim 9, wherein the first fastener comprises: an annular crimping portion provided at the front end of the spring seat, said crimping portion engaged with an outer periphery of an annular projection provided at the rear end of the front piston.

11. The brake system according to claim 9, wherein the first fastener comprises: a pin fitted in openings defined though the front end of the spring seat and the rear end of the front piston.

12. The brake system according to claim 9, wherein the first fastener comprises: a crimping portion provided at the front end of the spring seat with a groove provided at the rear end of the front piston.

13. The brake system according to claim 9, wherein the first fastener comprises: a U-shaped key engaged in a pair of grooves provided in the front end of the spring seat and a pair of grooves provided in the front piston.

14. A brake-by-wire brake system comprising:

a tandem master cylinder including two fluid pressure chambers for generating a brake fluid pressure in response to a braking operation by a driver;

a tandem slave cylinder; and an actuator operatively connected to the slave cylinder;

wherein the slave cylinder comprises:
    a cylinder body having a rear fluid pressure chamber and a front fluid pressure chamber formed therein for electrically generating brake fluid pressure corresponding to the braking operation;
    a rear piston and a front piston slidably fitted in the rear of the rear fluid pressure chamber and the front fluid pressure chamber, respectively, and
    a regulator disposed in the cylinder body, the regulator operatively attached to and operatively interconnecting the front and rear pistons, the regulator comprising:
        a first spring seat fixed to a rear end of the front piston and supporting a front end of a return spring provided under compression between the rear end of the front piston and a front end of the rear piston;
        a second spring seat disposed between the return spring and the rear piston and having a hole formed centrally therethrough;
        and a fastener having one end slidably fitted in a hole formed in a rear end of a guide portion of the spring seat, and an opposite end extending through the hole of the second spring seat and fixed to the front end of the rear piston;

wherein the slave cylinder is operable to generate brake fluid pressure in the rear fluid pressure chamber and the front fluid pressure chamber when the rear piston is advanced by the actuator;

wherein a wheel cylinder of a first stream is connected to one of the fluid pressure chambers of the master cylinder via the rear fluid pressure chamber of the slave cylinder;

wherein a wheel cylinder of a second stream is connected to the other fluid pressure chamber of the master cylinder via the front fluid pressure chamber of the slave cylinder;

wherein the regulator is configured and arranged to limit for regulating a maximum distance between the rear piston and the front piston of the slave cylinder, and thereby to limit a maximum volume of a pressurized one of the first and second pressure chambers in the event of a pressure loss in the other pressure chamber, wherein the wheel cylinders of the first and second streams are operated by the brake fluid pressure generated by the slave cylinder in a normal operation of the system, and wherein the wheel cylinders of the first and second streams are operated by the brake fluid pressure generated by the master cylinder in an abnormal operation of the system.

15. The brake system according to claim 14, wherein the front end of the spring seat is fixed to the rear end of the front piston by engaging an annular crimping portion provided at the front end of the spring seat with an outer periphery of an annular projection provided at the rear end of the front piston.

16. The brake system according to claim 14, wherein the front end of the spring seat is fixed to the rear end of the front piston by a pin fitting in openings defined through the front end of the spring seat and the rear end of the front piston.

17. The brake system according to claim 14, wherein the front end of the spring seat is fixed to the rear end of the front piston by engaging a crimping portion provided at the front end of the spring seat with a groove provided at the rear end of the front piston.

18. The brake system according to claim 14, wherein the front end of the spring seat is fixed to the rear end of the front piston by a U-shaped key engaged in a pair of grooves provided in the front end of the spring seat and a pair of grooves provided in the front piston.

19. The brake system according to claim 14, wherein the fastener is a bolt which has a head slidably fitted in a hole formed in a rear end of a guide portion of the first spring seat, and a rear end screwed in to the front end of the rear piston.

* * * * *